Aug. 23, 1960     J. F. PRIBONIC     2,950,124
FLUID SUSPENSION SYSTEM WITH VEHICLE HEIGHT AND ROLL CONTROL
Filed June 18, 1956     2 Sheets-Sheet 1

INVENTOR.
John F. Pribonic
BY
D. C. Staley
HIS ATTORNEY

2,950,124

FLUID SUSPENSION SYSTEM WITH VEHICLE HEIGHT AND ROLL CONTROL

John F. Pribonic, Dayton, Ohio, assignor to General Motors Corporation, Detroit, Mich., a corporation of Delaware Filed June 18, 1956, Ser. No. 592,175

11 Claims. (Cl. 280—124)

This invention relates to motor vehicles and more particularly to suspension systems using gas filled enclosed flexible casings in place of metal springs.

In addition to the conventional spring action, the stability and level position of vehicles on rough roads and turns are very important from the standpoint of safety, relative comfort of handling and easy riding. Even when standing, it is desirable to keep the vehicle level to maintain the proper relationship to the curb for the purpose of preventing the lower edge of any open door from dragging or binding upon the sidewalk or curb.

It is an object of this invention to provide an improved vehicle suspension system using gas filled enclosed flexible casings in place of metal springs having improved means for keeping the vehicle level on the turns and on rough roads.

It is another object of this invention to provide a vehicle suspension system with gas filled enclosed flexible casings in place of metal springs provided with improved means for leveling the vehicle whenever any one of the vehicle doors is opened.

It is a further object of this invention to provide a vehicle suspension system using gas filled enclosed flexible casings in the place of metal springs in which the flexible casings are so connected as to provide greater absorption of the shock from bumps or depressions engageable by wheels alternately on opposite sides of the vehicle.

These and other objects are attained in the form shown in the drawings in which the enclosed flexible casings are connected by a hollow cross member of the frame providing communication between the interior of the casings. A valve is provided in the hollow cross member which is normally open to permit free communication between the interiors of the casings to permit greater freedom of movement of the wheels when they engage bumps and depressions alternately on opposite sides. This valve however is closed in response to making a turn or the opening of a door so that the leveling system of the vehicle is effective under those circumstances. The leveling system also includes a valve mechanism controlled by the relative position of the wheels and the support to admit or discharge air from the casings to keep the vehicle level during a turn or when any of the doors are open.

Further objects and advantages of the present invention will be apparent from the following description, reference being had to the accompanying drawings, wherein a preferred form of the present invention is clearly shown.

In the drawings:

Figure 3 is a diagrammatic view showing one form of steering arrangement.

Figure 1:
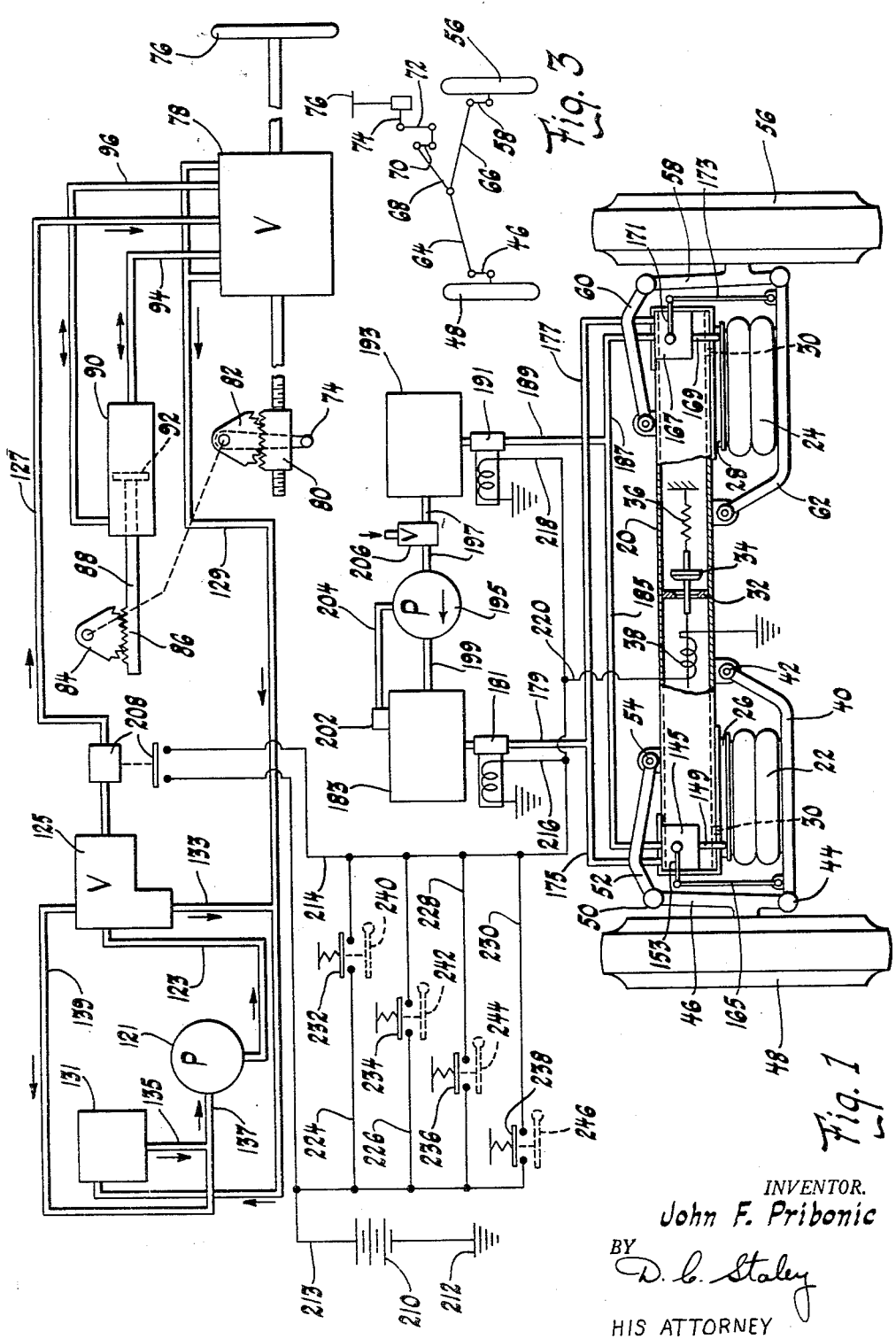
Figure 1 is a diagrammatic representation of a passenger motor vehicle and suspension system with conventional portions of the vehicle omitted.
Figure 2:
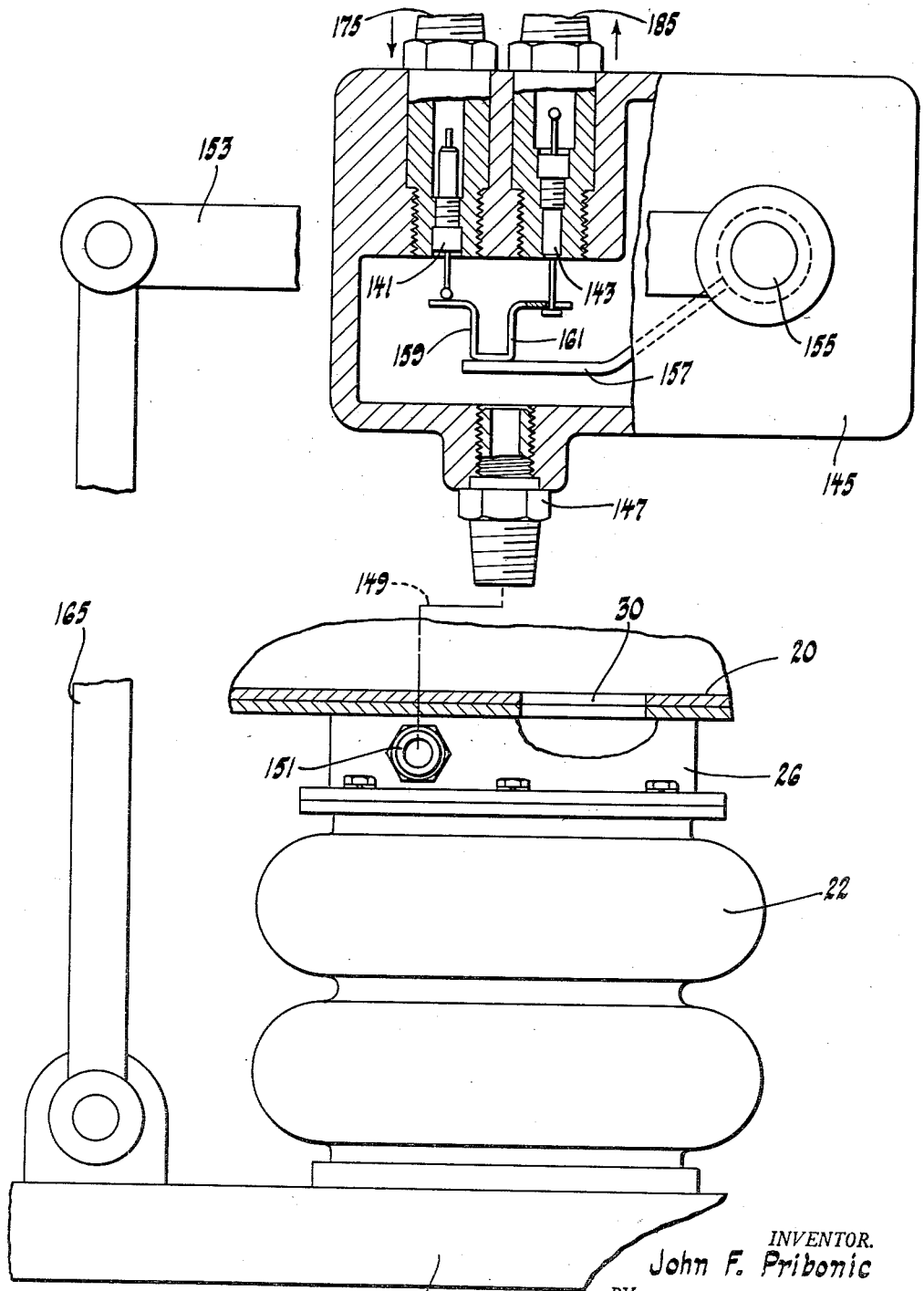
Figure 2 is a fragmentary enlarged view, partly in section, of the enclosed flexible casing and the control valve therefor.

Referring now to the drawings and more particularly to Figure 1 there is shown a passenger motor car with conventional portions omitted. There is shown a passenger car frame including a hollow front cross member 20 which rests upon the left gas filled enclosed flexible casing 22 and the right gas filled enclosed flexible casing 24. Hollow mountings 26 and 28 are provided between the cross member 20 and the casings 22 and 24. These hollow mountings 26 and 28 and the cross member 20 have common openings 30 providing direct communication between the interior of the cross member 20 and the interior of the casings 22 and 24. By this arrangement the hollow cross member 20 forms a conduit communicating with the interiors of the casings 22 and 24. The interior of the cross member 20 is provided with a valve seat 32 and a normally open valve 34. The valve 34 is normally kept in open position by a tension spring 36 and is closed by a solenoid actuator 38.

The casing 22 rests upon a lower control arm 40 pivoted at its inner end by the pivotal connection 42 to the cross member 20 and pivotally connected by a lower ball joint connection 44 to a steering knuckle 46 provided with a spindle for the left front wheel 48. The steering knuckle 46 also has an upper ball joint pivotal connection 50 with the upper control arm 52 the inner end of which is pivotally connected by the pivotal connection 54 to the cross member 20. Similarly, the right front wheel 56 is rotatably mounted upon the spindle of the right steering knuckle 58 connected by ball joints to the upper and lower control arms 60 and 62 similarly pivotally connected to the cross member 20. The casing 24 rests upon the lower control arm as shown. As shown in Figure 3 the steering knuckles each have steering arms connected by the tie rods 64 and 66 to the link 68 the bell crank lever 70 and the drag link 72 to the pitman arm 74 of the steering gear.

Although a power steering system is shown, if desired a manual system may be substituted. The power steering system shown includes a steering wheel 76 connecting through a steering column through the hydraulic valve 78 to a screw on which is threaded a nut 80 having teeth in the form of a rack meshing with the sector gear 82. The sector gear 82 and the pitman arm 74 are connected together and pivoted on a common axis. A second sector gear 84 is also connected to the pitman arm 74 and the sector gear 82 and is rotatably mounted on the same axis. The second sector gear 84 meshes with the teeth in the form of a rack 86 provided upon the piston rod 88 extending into the cylinder 90 and connecting with the piston 92. The hydraulic valve 78 is conventional for power steering and has one outlet connected by the conduit 94 to the right end of the cylinder 90 and a second outlet connected by the conduit 96 to the left end of the cylinder 90.

The valve 78 is supplied with a hydraulic liquid from the pump circuit which includes an engine driven hydraulic pump 121 discharging through a conduit 123 into a control valve 125. When the valve 78 is opened, the control valve 125 discharges the hydraulic liquid through the conduit 127 to the valve 78. The valve 78 controls the flow of hydraulic liquid into either end of the cylinder 90 so as to assist in the turning movement of the wheels provided by turning the steering wheel 76. The fluid in the opposite end of the cylinder 90 then discharges through the valve 78 and through the discharge conduit 129 connecting with the reservoir 131. The valve 125 has a pressure relief outlet connected by the conduit 133 with the conduit 129. The reservoir 131 is connected by the conduits 135 and 137 with the inlet to the pump 121. The control valve 125 also has a flow valve which permits the hydraulic liquid to recirculate through the conduit 139 back to the conduit 137 whenever there is a surplus of hydraulic fluid being pumped. Normally when the car is being driven straight ahead, the steering wheel is substantially stationary and no fluid will be discharged from the valve 125 so that normally all the fluid being pumped by the pump 121 is being recirculated but kept under pressure.

The flexible casings 22 and 24 are each provided with leveling means including inlet valves 141 and outlet valves 143 (not shown in valve body 167) both of which may be similar to ordinary automobile tire valves. These valves 141 and 143 are provided in a valve body 145 having an outlet connection 147 connected by a conduit 149 with a connection 151 in the mounting 26. The valve body 145 is connected to the cross member 20 as is shown in Figure 1. The valve body 145 is also provided with a lever 153 pivoted to the valve body 145 by the pin 155. The pin 155 also connects to an internal lever arm 157 within the valve 145 having an arm 159 adapted to engage and open the inlet valve 141 upon an upward movement of the inner lever 157. The inner lever 157 has a second arm 161 adapted to engage and pull the outlet valve 143 downwardly to open position with a downward movement of the inner lever 157. The outer lever 153 is pivotally connected by a link 165 with the lower control arm 40.

A similar arrangement is provided for the right wheel including the valve body 167 provided with a connection 169 with the interior of the mounting 28 and a lever 171 and a link 173 providing connection with the lower control arm 62. The valve bodies 145 and 167 have their inlet valves such as the inlet valve 141 connected by the conduits 175 and 177 and 179 as well as the valve 181 with a high pressure reservoir 183. The discharge valves of the valve bodies 145 and 167 such as the discharge valve 143 are connected by the conduits 185, 187 and 189 and the valve 191 with a low pressure reservoir 193. A pump 195 is provided for pumping air or other suitable gas from the low pressure pneumatic reservoir 193 through the conduit 197. The pump 195 discharges through the conduit 199 into the high pressure reservoir 183. The high pressure pneumatic reservoir 183 has a pressure relief valve 202 provided with a discharge connection 204 to the suction side of the pump 195. The conduits 197 are provided with a make up suction inlet valve 206 of an automatic type permitting air to enter the system whenever the reservoir 193 is below atmospheric pressure.

The valves 181 and 191 are normally closed so that under such circumstances the interior of the cross member 20 and the flexible casings 22 and 24 constitute a flexible sealed chamber. If the left wheel 48 strikes a bump at the same time as the right wheel 56 enters a depression the air will merely be transferred from the casing 22 to the casing 24 substantially without any resistance through the hollow cross member 20. This provides a level ride under the circumstances. The valve 34 remains open under all normal operating conditions except during turns and whenever a car door is opened. Likewise the valves 181 and 191 remain closed whenever the car is in normal operation excepting during turns and whenever one of the doors is opened. If bumps or depressions occur on both the left and right wheels simultaneously the casings 22 and 24 will be either compressed or expanded simultaneously to ease the shock by compressing or expanding the air in the casings and cross member 20. The resistance to compression is about twice as great when both left and right wheels strike bumps at the same time as compared to the resistance when only one wheel strikes a bump. Any difference in the upward and downward movement of the left and right wheels is accommodated by flow of air through the hollow cross member 20 through the opening of the valve seat 32. This provides a very satisfactory riding characteristic for straight ahead operation.

However in making a turn, it is desirable to keep the vehicle level. There is always a centrifugal force upon the car in making a turn. Normally the center of gravity is above the top of the casings 22 and 24. For this reason if the valve 34 would remain open whichever casing was on the outside of any turn would be collapsed and the casing on the inside of the turn would be expanded without any substantial resistance permitting the body to lean over. The lever and linkage connection between the lower control arms and the valve bodies 145 and 167 will open the inlet valve to the casing on the outside of the turn and open the outlet valve to the casing on the inside of the turn. These however will not have any effect until the valve 34 is closed and the valves 181 and 191 are open. To prevent the leaning of the car body and to make the leveling system effective during a turn, a pressure responsive switch 208 is connected to the conduit 127 and closes when the pressure is raised in the conduit 127. A control circuit includes a battery 210 having one side grounded as at 212 to the chassis and the other side connected by a conductor 213 to the pressure operated switch 208. The switch 208 is connected by the conductor 214 and the branch conductors 216 and 218 and 220 respectively to the solenoid actuator of the valves 181, 191 and 34. The pressure within the conduit 127 is raised whenever the steering wheel 76 is turned from one position to another to change the course of the vehicle. This will close the switch 208 and cause the closing of the valve 34 and the simultaneous opening of the valves 181 and 191. This will cause the valve 34 to close sealing the mid point of the cross member 20 and separating the air communicating with the flexible casings 22 and 24.

It is also desirable to keep the chassis level when the doors are opened. The reason for this is that when a heavy person steps into the car, the added weight will cause the car to tilt to one side. Frequently this tilting is sufficient to cause the open door to rest upon the sidewalk or curb, making it difficult to reclose. To overcome this difficulty, the pressure responsive switch 208 is shunted by four shunt circuits 224, 226, 228 and 230 containing the switches 232, 234, 236 and 238 which are opened by the closing of the car doors 240, 242, 244 and 246. These switches are normally spring pressed to closed position so that the opening of any one of the doors will close the shunt circuits connecting the conduits 213 and 214 to energize the solenoid 38 to close the valve 34 and to energize the solenoids of the valves 181 and 191 to open the pressure and suction conduits 179, 189 so that air or gas is forced into or withdrawn from the casings 22 and 24 according to the valve leveling mechanism provided by the links 165 and 173 and the levers 153 and 171 which control the valves within the valve bodies 145 and 167. This keeps the car level whenever any one of the doors is open and thus avoids the aforementioned difficulty.

While there has been shown on a front suspension, it is obvious that a similar rear suspension may also be provided with similar door switches and a similar pressure switch connected to the conduit 127. This arrangement provides a very easy riding gas or air suspension which will maintain the car level on curves and whenever someone is entering or leaving the car.

While the form of embodiment of the invention as herein disclosed constitutes a preferred form, it is to be understood that other forms might be adopted, as may come within the scope of the claims which follow.

What is claimed is as follows:

1. A vehicle including a support, left and right wheels movably connected to said support, left and right resilient gas casings operatively located between the left and right wheels and said support, a source of gas pressure, inlet and outlet valve means associated with each of said gas casings, means connecting said source and said inlet valve means, means responsive to the relative position of said support and said wheels to actuate said valve means to admit or discharge gas from said casings to maintain substantially the same relative positions of said support and said wheels, means for normally preventing the flow of gas to and from said valve means, steering means for steering the vehicle forwardly and to the right and left, said support having conduit means connecting the interiors of said left and right casings, normally open valve means providing for flow of gas through said conduit means, and means responsive to the turning of said steering means to the right or left for closing said normally open valve means.

2. In combination with a suspension system having control for both roll and changes in a predetermined clearance height maintained between a support and an undercarriage of a vehicle having steering mechanism and doors, comprising, left and right flexible gas-actuated means located between the support and undercarriage, a source of gas for said gas-actuated means, inlet and outlet valve means associated with said gas-actuated means to control intake and exhaust of gas from said source to said gas-actuated means for maintaining the predetermined clearance height, means for normally permitting cross flow of gas between said flexible gas-actuated means to ease shock due to force such as from road bumps, means normally blocking fluid intake and exhaust of gas to said gas-actuated means, and electrical circuit means operably associated with but independently actuated by the vehicle doors and the steering mechanism for simultaneously closing off the means normally permitting cross flow and opening the fluid blocking means for intake and exhaust of gas to said gas-actuated means to effect compensation for roll and change of clearance height back to the predetermined clearance height.

3. In combination with a pneumatic suspension system having control for both roll and changes in a predetermined clearance height maintained between a support and an undercarriage of a vehicle having doors and steering means, comprising, left and right gas-actuated means located between the support and undercarriage, a source of gas for said gas-actuated means, inlet and outlet valve means associated with said gas-actuated means to control intake and exhaust of gas from said source to said gas-actuated means for maintaining the predetermined clearance height, means normally permitting cross flow of gas between said gas-actuated means to ease shock due to force such as from road bumps, means for normally preventing the flow of gas to and from said valve means, means responsive to opening the vehicle doors at standstill for simultaneously closing the means normally permitting cross-flow as well as actuating the inlet and outlet valve means for maintenance of predetermined clearance height, and means responsive to turning of the steering means during vehicle movement also for simultaneously closing the means normally permitting cross-flow as well as actuating the inlet and outlet valve means for roll control.

4. In combination with a suspension system having control for both roll and changes in a predetermined clearance height maintained between a support and an undercarriage of a vehicle having doors and steering means, left and right gas-actuated means located between the support and undercarriage, a source of gas for said gas-actuated means, inlet and outlet valve means associated with said gas-actuated means to control intake and exhaust of gas from said source to said gas-actuated means for maintaining the predetermined clearance height, means normally permitting cross-flow of gas between said gas-actuated means to ease shock due to force such as from road bumps, means normally preventing the flow of gas to and from said valve means, means responsive to opening the vehicle doors including door switches in an electrical circuit for energizing electromagnets affecting said valve means and said means for normally permitting cross-flow simultaneously to close the cross-flow means and to activate the inlet and outlet valve means for control of changes in predetermined clearance height, and means responsive to turning of the steering means including a pressure responsive switch in the electrical circuit for energizing electromagnets affecting said valve means and said means for normally permitting cross-flow simultaneously to close the cross-flow means to activate the inlet and outlet valve means for control of vehicle roll during turning.

5. In combination with a vehicle suspension system for maintaining a predetermined clearance height between a support and an undercarriage of a vehicle having doors, left and right gas-actuated means located between the support and undercarriage, a source of gas for said gas-actuated means, inlet and outlet valve means associated with said gas-actuated means to control intake and exhaust of gas from said source to said gas-actuated means for maintaining the predetermined clearance height, means normally permitting cross-flow of gas between said gas-actuated means to ease shock due to force such as from road bumps, means responsive to the relative position of said support and said undercarriage to actuate said valve means to admit or discharge fluid from said gas-actuated means, means normally preventing the flow of gas to and from said valve means, and means responsive to opening the vehicle doors including door switches in an electrical circuit for energizing electromagnets affecting said valve means and said means normally permitting cross-flow simultaneously to close the cross-flow means and to activate the inlet and outlet valve means for control of changes in predetermined clearance height.

6. In combination with a vehicle suspension system for control of vehicle roll and for maintaining a predetermined clearance height between a support and an undercarriage of a vehicle having steering means, left and right gas-actuated means located between the support and undercarriage, a source of gas under pressure for said gas-actuated means, inlet and outlet valve means associated with said gas-actuated means to control intake and exhaust of gas from said source to said gas-actuated means for maintaining the predetermined clearance height, means normally permitting cross-flow of gas between said gas-actuated means to ease shock due to force such as from road bumps, means responsive to the relative position of said support and said undercarriage to actuate said valve means to admit gas or discharge gas from said gas-actuated means, means for normally preventing the flow of gas to and from said valve means, and means responsive to turning of the steering means including a pressure responsive switch in an electrical circuit for energizing electromagnets affecting said valve means and said means normally permitting cross-flow simultaneously to close the cross-flow means and to activate the inlet and outlet valve means for control of vehicle roll during turns and for maintenance of predetermined clearance height.

7. In a pneumatic suspension system for maintaining control of a predetermined clearance height between a sprung mass and an unsprung mass of a vehicle, the combination including, left and right wheels connected to the unsprung mass, left and right pneumatic resilient spring forming chamber means located between the sprung and unsprung masses, means interconnecting only the said chamber means and retaining therewithin a predetermined compressible volume of gas under controlled predetermined pressure, said interconnecting means normally permitting free flow of gas between the said chamber means as either left and right wheels move alternately up and down concurrently under constant gas pressure while the gas pressure is increased for greater resistance and resilient support when both wheels go up simultaneously and vice versa when both wheels go down simultaneously during vehicle movement at other than turning thereof, and a valve means located in said interconnecting means normally open but closing and separating said chamber means into separately acting spring means, during vehicle turning with gas pressure increased and decreased independently in each chamber means and part of said interconnecting means without substantially changing volume for roll control when the wheels go up or down during vehicle turning.

8. In a pneumatic suspension system for maintaining a predetermined clearance height between a sprung mass and an unsprung mass of a vehicle, comprising, left and right wheels connected to the unsprung mass, left and right pneumatic spring devices located between the sprung and unsprung masses, means interconnecting said pneumatic spring devices and retaining therewith a volume of gas under pressure, said interconnecting means normally permitting free flow of gas between the left and right devices as either left and right wheels move alternately up and down concurrently under constant gas pressure while the gas pressure is increased for greater resistance and resilient support when both wheels go up simultaneously and vice versa when both wheels go down simultaneously during vehicle movement to ease shock due to force as from road bumps, and means responsive independently to a first force during vehicle standstill and a second force during vehicle turning to effect blocking of free flow of gas in said interconnecting means to permit control of increase and decrease of gas pressure in each pneumatic spring device independent of increase and decrease of gas pressure in the normally interconnected pneumatic spring devices.

9. In a pneumatic suspension system for maintaining a predetermined clearance height between a sprung mass and an unsprung mass of a vehicle, the combination comprising, a vehicle having a pneumatic spring unit located between the sprung and unsprung masses at each of opposite sides of the vehicle at the same end thereof operating in paired relationship only, control means independently controlling flow of gas to and from said spring units to maintain said predetermined clearance height, means interconnecting said units and retaining therewithin a predetermined volume of gas under controlled predetermined pressure, said interconnecting means normally providing for free flow of gas between the said units on expansion or contraction of the units together or oppositely, and means actuated by a force signal indicating a turning movement of the vehicle causing blocking of free flow of gas between said spring units to effect thereby increase in fluid pressure in one of said spring units and decrease in fluid pressure in the other of said spring units independently on change of angular attitude of the vehicle during said turning movement of the vehicle without substantially changing volume.

10. A vehicle including a support, left and right wheels movably connected to said support, left and right resilient pneumatic spring units operably located between the left and right wheels and said support, a source of gas pressure, inlet and outlet valve means associated with each of said spring units, means connecting said source and said inlet valve means, means responsive to the relative position of said support and said wheels to actuate said valve means to admit or discharge gas from said spring units independently to maintain thereby substantially the same relative positions of said support and said wheels, steering means for steering the vehicle forwardly and to the right and left, conduit means connecting the interiors of said left and right spring units, normally open valve means providing for flow of gas through said conduit means for free flow between said left and right spring units, and means responsive to the turning of said steering means to the right or left for closing said normally open valve means and separating thereby said left and right spring units obtaining increase and decrease of gas pressure therein in response to the valve actuating means without substantially changing the volume of said spring units.

11. In a pneumatic suspension system for maintaining a predetermined clearance height between a sprung mass and an unsprung mass of a vehicle, the combination comprising, a vehicle having a pneumatic spring unit located between the sprung mass and the unsprung mass at each of opposite sides of the vehicle at the same end thereof operating in paired relationship only, said vehicle including hydraulically operated steering means, control means actuated by a change in predetermined clearance height between the sprung mass and the unsprung mass of the vehicle to supply pneumatic pressure to said units or exhaust pressure from said units independently whereby to maintain said predetermined clearance height relation between the sprung mass and the unsprung mass, conduit means interconnecting the interiors of said units independently of the connection of said units with said control means and including valve means therein normally open to provide for interchange of pneumatic pressure between the said units, said valve means being actuated by operation of said steering means in turning the vehicle to block interchange of fluid pressure between said spring units during the steering movement of the vehicle, said control means being actuated by change in predetermined clearance height between the sprung mass and the unsprung mass of the vehicle produced by a change in attitude of the sprung mass relative to the unsprung mass during the turning movement of the vehicle to maintain thereby said predetermined clearance height.

References Cited in the file of this patent

UNITED STATES PATENTS

| | | |
|---|---|---|
| 871,186 | Rosenzweig | Nov. 19, 1907 |
| 1,066,712 | Cooper | July 8, 1913 |
| 1,104,294 | Erickson | July 21, 1914 |
| 1,555,199 | Gouirand | Sept. 29, 1925 |
| 1,641,640 | Myers | Sept. 6, 1927 |
| 1,816,075 | Down | July 28, 1931 |
| 2,249,402 | Stefano | July 15, 1941 |
| 2,361,575 | Thompson | Oct. 31, 1944 |
| 2,644,699 | Weiertz | July 7, 1953 |
| 2,687,311 | Nallinger | Aug. 24, 1954 |
| 2,762,633 | Gouirand | Sept. 11, 1956 |

FOREIGN PATENTS

| | | |
|---|---|---|
| 1,110,226 | France | Oct. 5, 1955 |